United States Patent [19]

Omura

[11] Patent Number: 5,415,431
[45] Date of Patent: May 16, 1995

[54] SEAT BELT PRETENSIONER SYSTEM
[75] Inventor: Hideo Omura, Yokosuka, Japan
[73] Assignee: Nissan Motor Co., Ltd., Yokohama, Japan
[21] Appl. No.: 91,018
[22] Filed: Jul. 14, 1993
[30] Foreign Application Priority Data
　Aug. 4, 1992 [JP]　Japan .................. 4-206883
[51] Int. Cl.6 ............................................ B60R 22/46
[52] U.S. Cl. .................................... 280/805; 280/806;
　　242/374; 242/381.1; 297/480
[58] Field of Search .................. 280/806, 805, 807;
　　242/374, 381.1; 297/480, 478, 477

[56]　References Cited
U.S. PATENT DOCUMENTS

| 3,375,994 | 4/1968 | Wohlert et al. | 297/478 |
| 4,470,617 | 9/1984 | Yamada et al. | 280/806 |
| 4,662,487 | 5/1987 | Koch | 280/805 |
| 5,118,135 | 6/1992 | Yano | 280/806 |
| 5,127,671 | 7/1992 | Yano et al. | 280/806 |
| 5,163,708 | 11/1992 | Kotama | 280/806 |
| 5,195,694 | 3/1993 | Watanabe et al. | 280/806 |
| 5,314,138 | 5/1994 | Watanabe et al. | 280/806 |

FOREIGN PATENT DOCUMENTS
63-74358　5/1988　Japan .

Primary Examiner—Margaret A. Focarino
Assistant Examiner—Peter C. English
Attorney, Agent, or Firm—Foley & Lardner

[57]　ABSTRACT

A seat belt system having a collision sensor that detects an impact which a vehicular body undergoes, and a pretensioner mechanism which starts retraction of a webbing responsive to the impact detected by the collision sensor and completes retraction of the webbing when tension of the webbing coincides with a fuse load thereof.

11 Claims, 13 Drawing Sheets

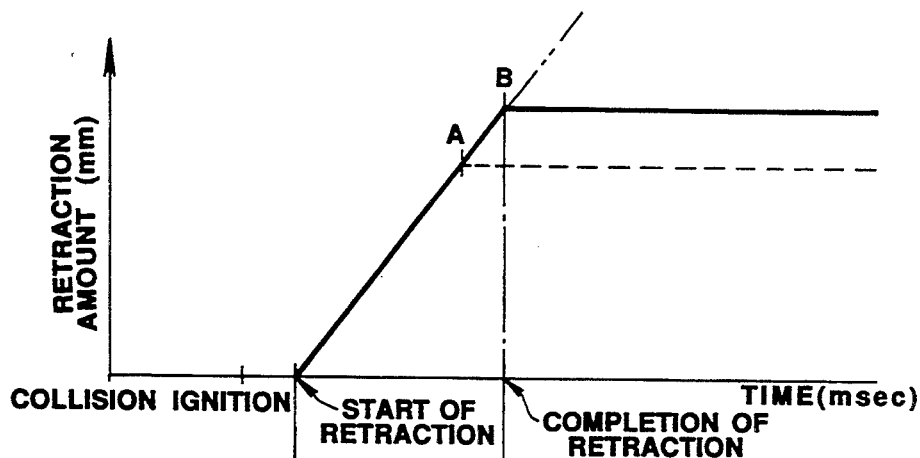
FIG.4A RETRACTION AMOUNT-TIME CHARACTERISTIC
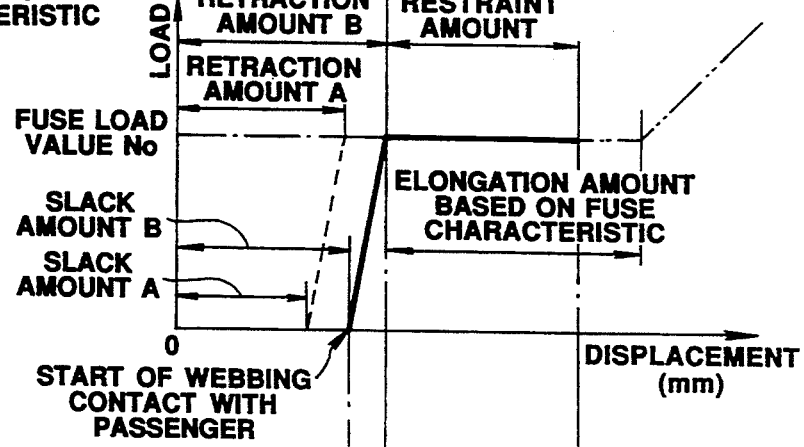
FIG.4B LOAD-DISPLACEMENT CHARACTERISTIC
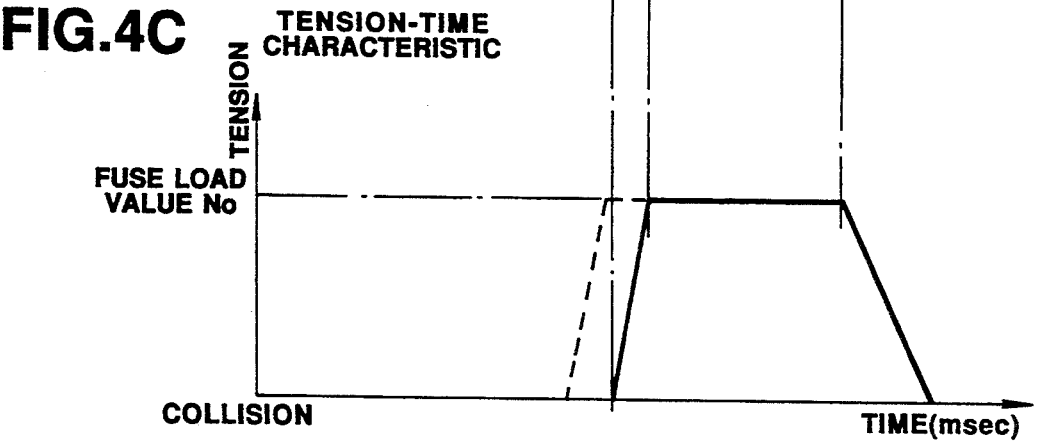
FIG.4C TENSION-TIME CHARACTERISTIC

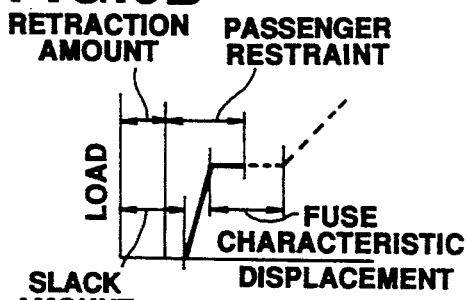
FIG.5B COMPARATIVE EXAMPLE 1
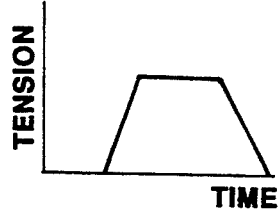
FIG.5C
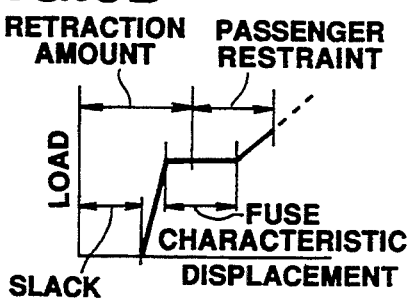
FIG.5D COMPARATIVE EXAMPLE 2
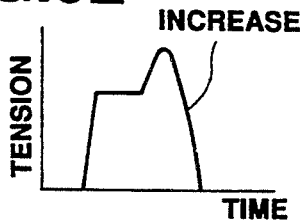
FIG.5E
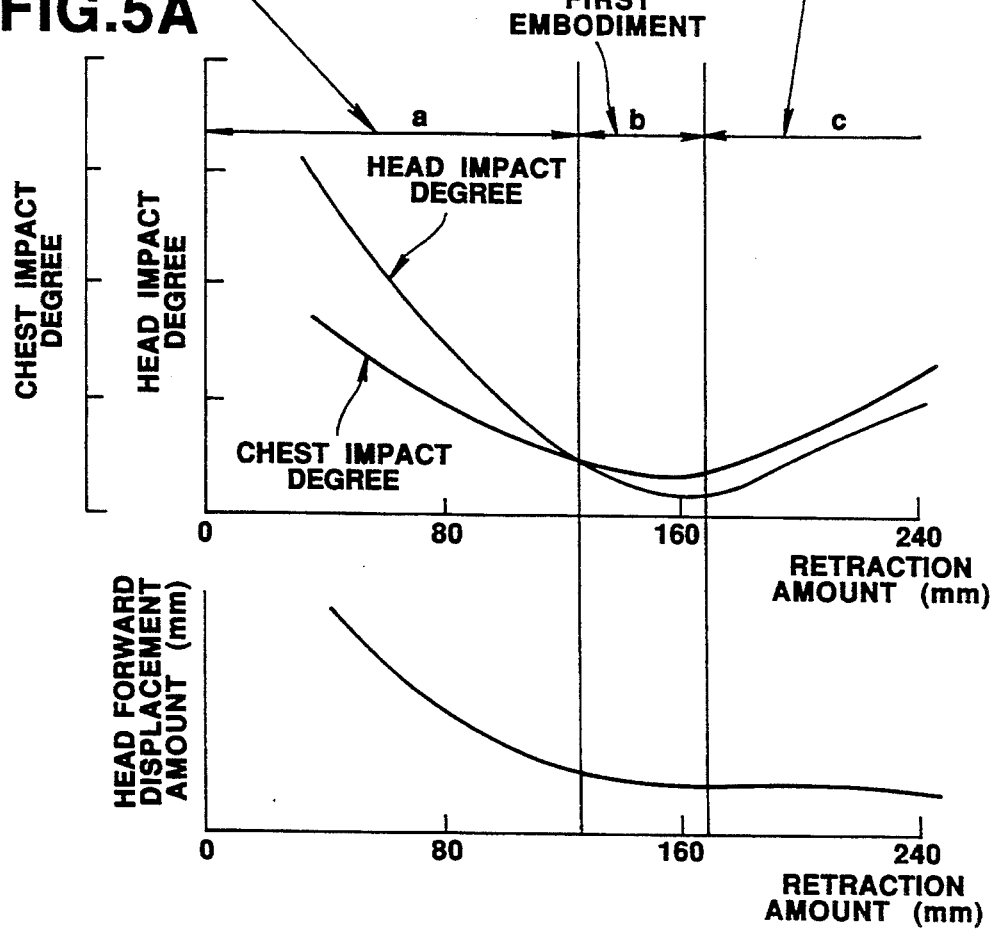
FIG.5A

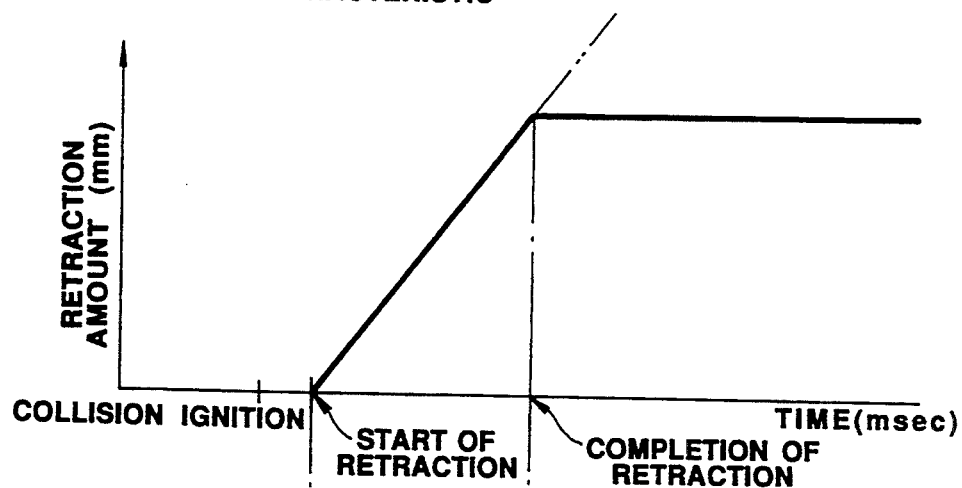
FIG.9A RETRACTION AMOUNT-TIME CHARACTERISTIC
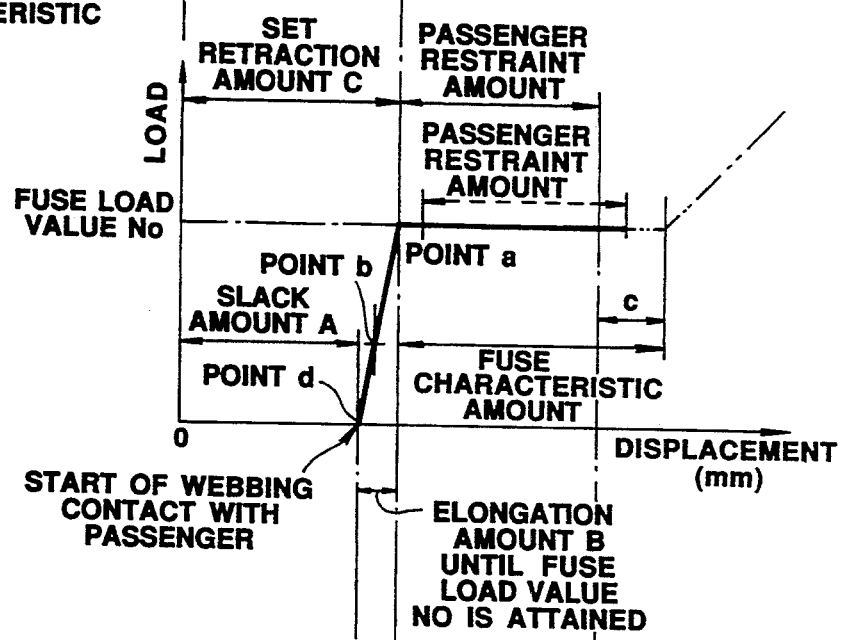
FIG.9B LOAD-DISPLACEMENT CHARACTERISTIC
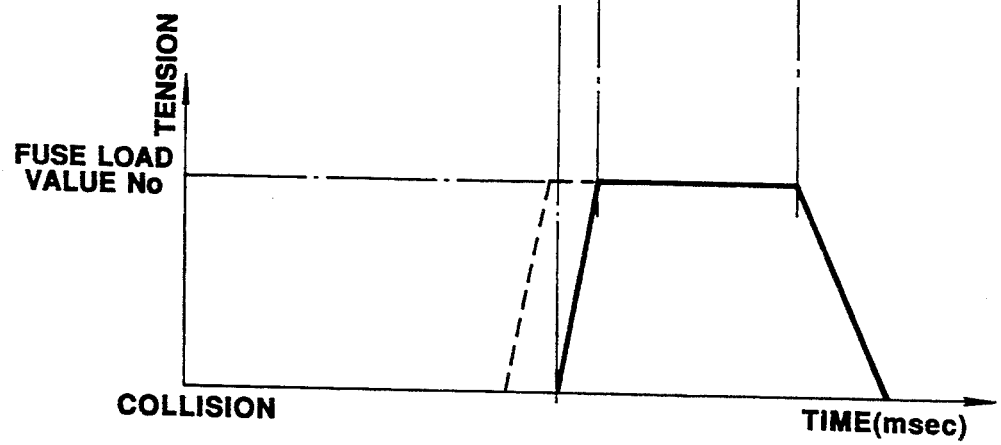
FIG.9C

SEAT BELT PRETENSIONER SYSTEM

BACKGROUND OF THE INVENTION

The present invention relates generally to a seat belt system, and more particularly, to a seat belt system constructed to restrain upon vehicular collision a passenger with tension of a webbing alleviated after preventing tightening thereof by a retractor.

A seat belt system is disclosed, for example, in JP-U 63-74358. Referring to FIG. 13, with this seat belt system, when a collision sensor 101 detects a vehicular collision, an actuating rod 103 of a pusher 102 draws a webbing 107 between a spool 108 of a retractor 104 and a shoulder anchor 106, preventing tightening of the webbing 107 by the retractor 104. After maximum operation of the actuating rod 103, drawing force thereof is gradually decreased to alleviate tension of the webbing 107.

With the above prior art, however, the webbing 107 does not have a specified drawing load, retraction amount, and tension alleviating timing after retraction by the pusher 102. As a result, if the webbing 107 has small retraction amount by the pusher 102, a tightening amount of the webbing 107 by the retractor 104 or slack amount thereof cannot sufficiently be absorbed. On the other hand, if the tension alleviating timing is lagged due to great retraction amount or retraction load of the webbing 107 by the pusher 102, restraint force to a passenger becomes much too great.

Further, a means for alleviating tension of the webbing 107 is constructed to rely upon the balance between a return amount of the actuating rod 103 from the pusher 102 due to degassing and the tightening amount of the webbing 107 by the retractor 104, so that even if the webbing 107 has appropriate retraction amount, retraction load, and tension alleviating timing by the pusher 102, the webbing 107 is difficult to stably draw out from the retractor 104 with a predetermined load. Furthermore, when drawing force of the actuating rod 103 for the webbing 107 is suddenly decreased due to sudden degassing of the pusher 102, the retractor 104 cannot carry out tightening of the webbing 107 in a manner to follow that decrease in drawing force, resulting in difficult slackness of the webbing 107.

On the other hand, even if the prior art webbing 107 is of the type having a fuse characteristic that when arriving at a fuse load as previously set, elongation is made by a predetermined amount so as to enable restraint on a load increase, there arises the problem that when the tension alleviating timing is lagged due to great retraction amount or retraction load of the webbing 107 by the pusher 102, the pusher 102 absorbs the predetermined amount of elongation of the webbing 107 by the fuse characteristic, resulting in difficult application of the fuse characteristic upon vehicular collision.

It is, therefore, an object of the present invention to provide a seat belt system having an improved performance.

SUMMARY OF THE INVENTION

There is provided, according to the present invention, a seat belt system for a vehicle having a vehicular body, comprising:

a webbing, said webbing elongating a predetermined amount to restrain a load increase of said webbing when a tension of said webbing coincides with a fuse load as previously set;

an anchorage mounted to the vehicular body, said anchorage being connected to said webbing at one end thereof;

a retractor mounted to the vehicular body, said retractor being connected to said webbing at another end thereof for winding said webbing;

an impact detecting means for detecting an impact which the vehicular body undergoes; and a pretensioner means for starting a retraction of said webbing responsive to said impact detected by said impact detecting means, and completing said retraction of said webbing when said tension of said webbing coincides with said fuse load.

BRIEF DESCRIPTION OF THE DRAWINGS

FIG. 4A is a view similar to FIG. 1B, showing a retraction amount-time characteristic of the webbing;

FIG. 4B is a view similar to FIG. 4A, showing a load-displacement characteristic of the webbing;

FIG. 4C is a view similar to FIG. 4B, showing a tension-time characteristic of the webbing;

FIG. 5A is a view similar to FIG. 4C, showing a chest impact degree/head impact degree/head forward displacement amount-retraction amount characteristic of the webbing in the first embodiment;

FIG. 5B is a view similar to FIG. 5A, showing a load-displacement characteristic of the webbing in a first comparative example;

FIG. 5C is a view similar to FIG. 5B, showing a tension-time characteristic of the webbing in the first comparative example;

FIG. 5D is a view similar to FIG. 5C, showing a load-displacement characteristic of the webbing in a second comparative example;

FIG. 5E is a view similar to FIG. 5D, showing a tension-time characteristic of the webbing in the second comparative example;

FIG. 9A is a view similar to FIG. 6B, showing a retraction amount-time characteristic of the webbing in the second embodiment;

FIG. 9B is a view similar to FIG. 9A, showing a load-displacement characteristic of the webbing in the second embodiment;

FIG. 9C is a view similar to FIG. 9B, showing a tension-time characteristic of the webbing in the second embodiment;

DETAILED DESCRIPTION OF THE INVENTION

Figure 1A:
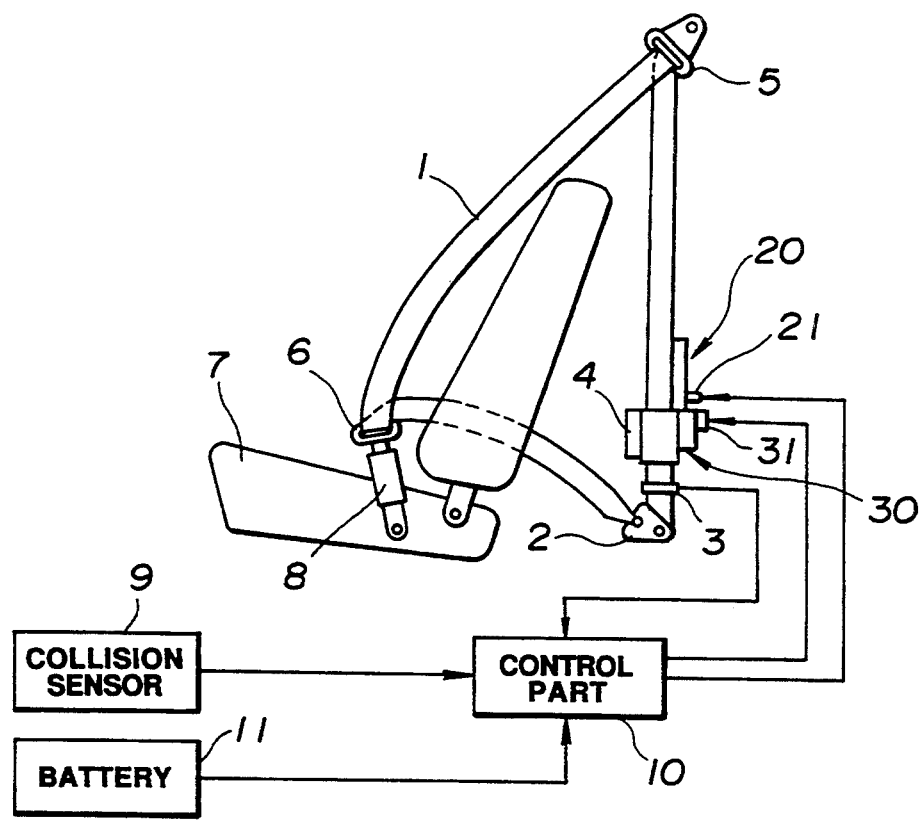
FIG. 1A is a schematic block diagram showing a first embodiment of a seat belt system according to the present invention.

Referring to the drawings wherein like reference numerals designate like parts throughout the views, referring first to FIGS. 1A–5E, there is shown a first embodiment of a seat belt system of the three-point type. Referring first to FIG. 1A, a webbing, generally designated by 1, has one end mounted to a vehicular body in the lower part thereof through an anchorage 2, and another end wound to a retractor 4 which is mounted to the vehicular body through a load cell 3 as a tension detecting means. The webbing 1 is movable between the retractor 4 and the anchorage 2 by way of a shoulder anchor 5 mounted to the vehicular body in the upper part thereof and on the same side as that of the anchorage 2 as viewed in the cross direction of a vehicle. Also, the webbing 1 is movable between the shoulder anchor 5 and the anchorage 2 by way of a tongue 6. When setting the webbing 1 to a passenger seated on a seat 7, the tongue 6 is engaged with a buckle 8 mounted to the vehicular body in the lower part thereof in the vicinity of the seat 7 and on the side opposite to the anchorage 2 as viewed in the cross direction of the vehicle, whereas when detaching the webbing 1 from the passenger, the tongue 6 is disengaged from the buckle 8.

Figure 1B:
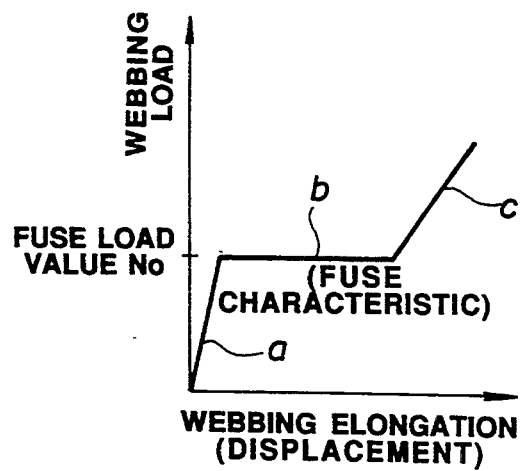
FIG. 1B is a graph showing a load-elongation characteristic of a webbing in the first embodiment.

Referring to FIG. 1B, the webbing 1 is a so-called fuse webbing having a fuse characteristic that until a load operating on the webbing 1 arrives at a fuse load value No a little elongation is made with a load increase, and when the load arrives at a predetermined fuse load elongation is made by a predetermined amount so as to restrain a load increase. The webbing 1 is made, for example, of a base material having high extensibility, and a additional material having low extensibility to break down at the fuse load value No. Specifically, when the webbing 1 undergoes a load less than the fuse load value No, the additional material produces a steep incline characteristic "a" as seen in the opening part of a load-displacement characteristic as shown in FIG. 1B, and starts to break down at the fuse load value No. After breakdown of the additional material, the base material elongates due to high extensibility up to the limit thereof, producing the fuse characteristic "b" as seen in the middle part of the load-displacement characteristic as shown in FIG. 1B. Further, when the webbing 1 undergoes a load more than the fuse load value No, the base material produces an incline characteristic "c" as seen in the ending part of the load-displacement characteristic as shown in FIG. 1B. This incline characteristic "c" comes to an end at a final point that the base material breaks down.

Referring again to FIG. 1A, a collision sensor 9 as a collision detecting means outputs a detected collision signal to a control part 10 when collision of the vehicle occurs with impact exceeding a reference value. The reference value is a value at which the passenger should be restrained by the webbing 1 with unwinding thereof from the retractor 4 prohibited so as to prevent the upper part of a passenger's body from becoming in the forward inclined state by impact upon vehicular collision. That is, if impact of collision is more than the reference value, the upper part of the passenger's body becomes in the forward inclined state upon vehicular collision. The control part 10 is operated by power of a battery 11 as a vehicular power supply and it outputs igniting power to a gas generator 21 of a pretensioner mechanism 20 attached to the retractor 4 when inputting a detected collision signal from the collision sensor 9. The load cell 3 detects tension produced in the webbing 1 upon vehicular collision, and outputs an electric signal to the control part 10 in accordance with the tension as detected. When the tension as detected by the load cell 3 coincides with the fuse load value No as previously set in the control part 10, the control part 10 outputs actuating power to an electromagnetic drive self-reset type actuator 31 of a clamp mechanism 30 as a holding means attached to the retractor 4. It is to be noted that in the first embodiment, the control part 10 and the pretensioner mechanism 20 constitute a pretensioner means.

Figure 2:
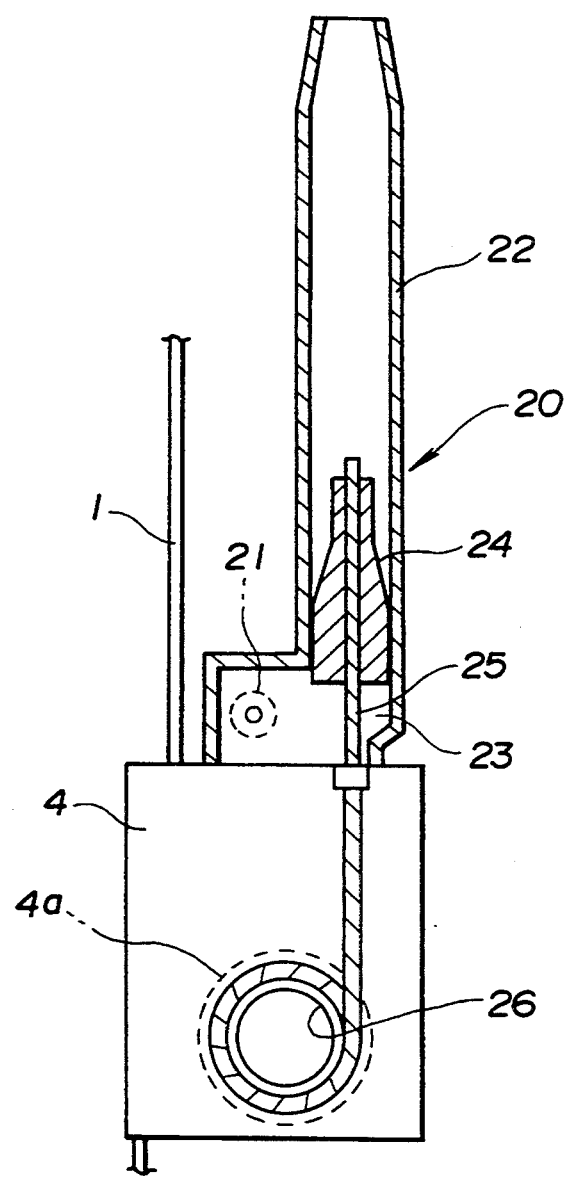
FIG. 2 is a diagrammatic view showing a pretensioner in the first embodiment.

Referring next to FIG. 2, the pretensioner mechanism 20 includes a gas generator 21 filled with inert gas such as nitrogen gas. The gas generator 21 is opened by igniting power from the control part 10 so as to jet filled gas into a lower chamber 23 of a cylinder 22. Gas as jetted into the lower chamber 23 of the cylinder 22 urges a piston 24 within the cylinder 22 upward. A wire 25 has one end connected to the piston 24, and another end wound on a shaft 26 coaxially mounted to a reel 4a for winding the webbing 1 of the retractor 4. Therefore, according to the pretensioner mechanism 20, gas is jetted into the lower chamber 23 of the cylinder 22 from the gas generator 21 so as to urge the piston 24 upward. The wire 25 rotates the shaft 26 in one direction, which in turn rotates the reel 4a of the retractor 4 to wind the webbing 1 thereon, thus retracting same.

Figure 3:
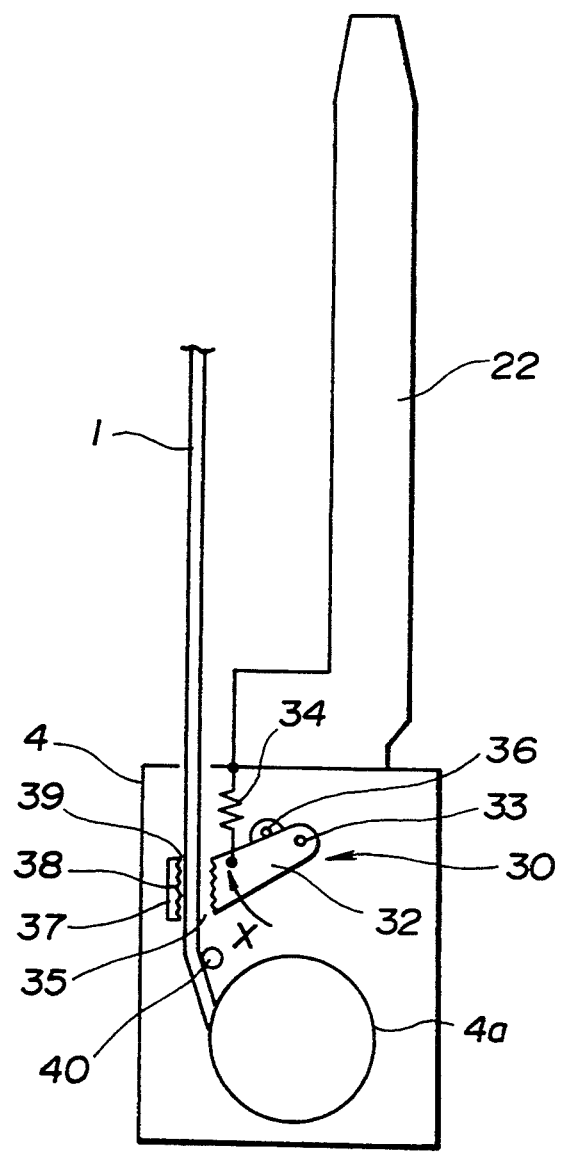
FIG. 3 is a view similar to FIG. 2, showing a clamp mechanism in the first embodiment.

Referring to FIG. 3, the clamp mechanism 30 has a clamp arm 32 rotatably mounted to the retractor 4 through a shaft 33, and biased by a spring 34 disposed between the clamp arm 32 and the retractor 4 to rotate about the shaft 33 in the unwinding direction of the webbing 1 or direction as indicated by an arrow X in FIG. 3. The clamp arm 32 has a free end formed with teeth 35. In a normal working state of the seat belt system, the clamp arm 32 contacts a stopper 36 which protrudes due to self-reset function of the actuator 31 as shown in FIG. 1A, preventing rotation thereof by force of the spring 34. Due to rotation of the clamp arm 32 as prevented, a passage 39 is defined between the teeth 35 of the clamp arm 32 and teeth 38 of a receiver 37 secured to the retractor 4 so as to ensure free winding and unwinding of the webbing 1 relative to the retractor 4. Referring also to FIG. 1A, according to the clamp mechanism 30, when tension as detected by the load cell 3 coincides with the fuse load value No, and the actuator 31 is driven by actuating power output from the control part 10 so as to retract the stopper 36, the clamp arm 32 is rotated about the shaft 33 by the spring 34 in the direction as indicated by the arrow X in FIG. 3, and the teeth 35 of the clamp arm 32 and that ones 38 of the receiver 37 cooperate with each other to hold the webbing 1, preventing the webbing from being retracted by the pretensioner mechanism 20. It is to be noted that in FIG. 3, reference numeral 40 designates a guide pin of the webbing 1 attached to the retractor 4.

Referring again to FIG. 1A, according to the first embodiment, the passenger as seated on the seat 7 draws out the webbing 1 from the retractor 4, and engages the tongue 6 with the buckle 8, thus setting the webbing 1 to the passenger so as to extend from his waist to the upper part of his body. In this state, if vehicular collision occurs, and the collision sensor 9 outputs a detected collision signal more than tile reference value to the control part 10, the control part 10 ignites the gas generator 21 of the pretensioner mechanism 20 so that the pretensioner mechanism 20 starts to retract the webbing 1. With a development of retraction of the webbing 1 by the pretensioner 20, the webbing 1 contacts the waist and the upper part of the body of the passenger, so that the webbing 1 undergoes a load. Then, the load cell 3 detects a load operating on the webbing 1, which is output to the control part 10. And, when a load as detected by the load cell 3 coincides with the fuse load value No, the control part 10 drives the actuator 31 of the clamp mechanism 30 so that the clamp mechanism 30 holds the webbing 1, completing retraction of the webbing 1 by the pretensioner mechanism 20. Then, the webbing 1 undergoes a load of the fuse load value No from the passenger, and restrains him with appropriate force in extending within a predetermined elongation range due to the fuse characteristic thereof.

Referring to FIGS. 4A-4C, this operation will be described in detail.

Referring first to FIG. 4A, upon vehicular collision, the gas generator 21 is ignited, so that tile pretensioner 20 starts to retract the webbing 1 after a jet of gas, winding the webbing 1 on the reel 4a of the retractor 4. Referring to FIG. 4B, in the initial stage of retraction. the webbing 1 contacts the passenger after eliminating slackness thereof. Also after start of contact with the passenger, the webbing 1 continues to be retracted as shown in FIG. 4A. As a result, the webbing 1 undergoes a load from the passenger appearing the first half of elongation or displacement thereof as shown in FIG. 4B. Referring to FIG. 4C, with the first half of elongation, tension of the webbing 1 starts to increase, and coincides with the fuse load value No. Thus, the clamp mechanism 30 holds the webbing 1, completing retraction of the webbing 1 as shown in FIG. 4A. Then, the webbing 1 restrains the passenger in extending due to the fuse characteristic as shown in FIG. 4B. Therefore, tension of the webbing 1 becomes constant as shown in FIG. 4C, resulting in flat waveform of deceleration produced in the passenger, and minimum impact thereto.

According to the first embodiment, a possible retraction amount of tile webbing 1 of the pretensioner mechanism 20 is set with a margin as indicated by a dotted line in FIG. 4A, so that even if a slack amount of the webbing 1 varies, particularly, increases due to a passenger's seating posture or clothes, the retraction amount of the webbing 1 increases in accordance therewith, resulting in sure retraction of the webbing 1 up to the fuse load value No.

In brief, according to the first embodiment, until a load operating on the webbing i arrives at the fuse load value No the pretensioner mechanism 20 retracts the webbing 1, and when this load coincides with the fuse load value No the clamp mechanism 30 holds the webbing 1, completing retraction of the webbing 1 by the pretensioner 20. As a result, even if a passenger with any build takes any seating posture, and has any clothes on, retraction of the webbing 1 can be carried out by an amount corresponding to the slack amount. A detailed description will be made with regard to this. Referring to FIGS. 4A-4C, each case as indicated by fully drawn line has greater slack amount than that one as indicated by the dotted line. That is, as shown in FIG. 4B, the slack amount B as indicated by the fully drawn line is greater than the slack amount A as indicated by tile dotted line. Further, as shown in FIG. 4A, a retraction completion time B in case of the great slack amount B is longer than a retraction completion time A in case of the small slack amount A. As a result, the retraction amount B in case of the great slack amount B is greater than the retraction amount A in case of the small slack amount A in accordance with an increase in the slack amount. Therefore, even with the slack amount varied, the webbing 1 is correctly retracted in an instant until a load arrives at the fuse load value No, having no posterior change in passenger restraint phenomenon. As a result, as shown in FIG. 4C, waveform of tension of the webbing 1 is equal only with a slight lag produced between the restraint time in case of the great slack amount B as indicated by the fully drawn line and that one in case of the small slack amount A as indicated by tile dotted line. Therefore, the performance is equal regardless of the magnitude of the slack amount. In such a way, according to the first embodiment, without being affected by a passenger's build, seating posture, and clothes, the webbing 1 can surely be retracted until a load operating on the webbing 1 coincides with the fuse load value No, obtaining always optimum performance.

Referring to FIGS. 5A-5E, there are shown test results with regard to the relationship between the retraction amount of the webbing 1 by the pretensioner mechanism 20 and a passenger's head impact degree, chest impact degree and head forward displacement amount. Referring to FIG. 5A, the retraction amount corresponds to an area "b" until a load arrives at the fuse load value No in the first embodiment. It will be understood that in this area "b", the head impact degree and the chest impact degree have a minimum value, respectively, the decreasing tendency of the head forward displacement amount making no progress. This is due to full absorption of slackness of the webbing 1. Further, with smaller head forward displacement amount, a space between the passenger and a steering wheel has a margin increased, enabling, even under hard collision conditions, prevention of a so-called bottom touch phenomenon that the passenger's head collides with the steering wheel or instrument panel or front glass located in front. Therefore, with a retraction characteristic of the area "b" as in the first embodiment the minimum head displacement amount can be obtained without unnecessarily retracting the webbing 1.

On the other hand, referring to FIGS. 5B and 5C, in case of a first comparative example that the webbing 1 fails to be retracted until a load arrives at the fuse load value No, i.e., an example having the retraction amount corresponding to an area "a" as shown in FIG. 5A, the head impact degree, chest impact degree, and head forward displacement amount tend to decrease remarkably with an increase in the retraction amount. That is because it is an area in which an increase in a winding amount affects a decrease in the slack amount as shown in FIG. 5B, producing a remarkable improvement of initial restraint. Therefore, with a retraction characteristic of the area "a", restraint performance is much improved as compared with the seat belt system without the pretension mechanism 20. However, since all slackness of the webbing 1 fails to be absorbed, the webbing 1 has a slow rising of tension as shown in FIG.

5C. and the webbing 1 fails to be retracted until a load arrives at the fuse load value No, a long time is taken until a load arrives at the fuse load value No, resulting in impossible acquisition of optimum initial restraint.

Referring to FIGS. 5D and 5E, in case of a second comparative example that retraction of the webbing 1 fails to be interrupted as soon as a load arrives at the fuse load value No, and continues further, i.e., an example having the retraction amount corresponding to an area "c" as shown in FIG. 5A, the head impact degree and the chest impact degree tend to increase with an increase in the retraction amount. Since the webbing 1 is retracted further after a load arrives at the fuse load value No as shown in FIG. 5D, a part of the fuse characteristic is reduced, which serves as passenger restraint. As a result, passenger restraint fails to finish only in a part of the fuse characteristic, and needs even a part of a load rising after completion of the fuse characteristic, increasing tension of the webbing i as seen in the second part of a tension-time characteristic in FIG. 5E. This increases deceitration produced in the passenger, enlarging impact degree thereof.

Therefore, it will be understood, based on a consideration in connection with FIGS. 5A–5E, that a sufficient improvement of impact degree cannot be obtained by a simple combination of retraction of the webbing 1 by the pretensioner mechanism 20 and the fuse characteristic of the webbing 1. On the other hand, if, as in the first embodiment, retraction of the webbing 1 by the pretensioner mechanism 20 is finished when tension of the webbing 1 coincides with the fuse load value No, passenger impact degree can be reduced with the bottom touch phenomenon prevented.

Figure 6:
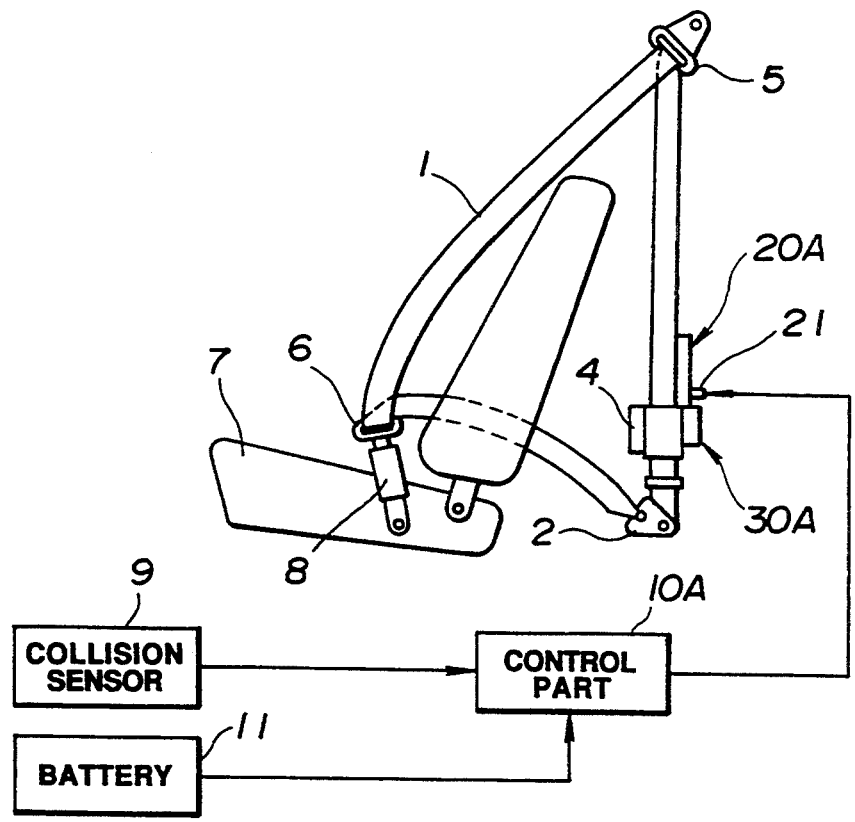
FIG. 6A is a view similar to FIG. 1, showing a second embodiment of the present invention.
FIG. 6B is a view similar to FIG. 5E, showing a load-elongation characteristic of the webbing in the second embodiment.
Figure 6:
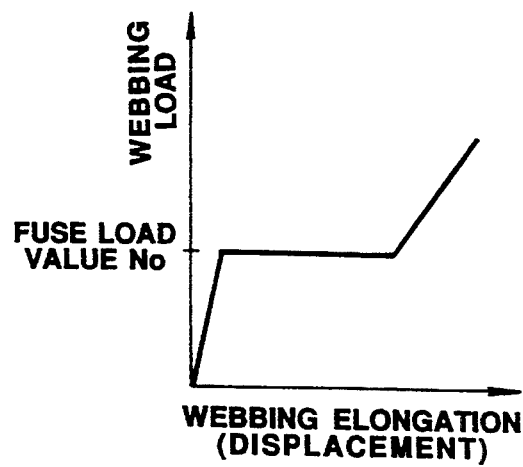

Referring next to FIGS. 6A–9C, there is shown a second embodiment of a seat belt system of the three-point type. Referring to FIG. 6A, a retractor 4 is directly, or without a load cell 3 (see FIG. 1A), mounted to the vehicular body in the lower part thereof. Attached to the retractor 4 are a pretensioner mechanism 20A and a clamp mechanism 30A. A control part 10A is operated by power of a battery 11, and it outputs igniting power to a gas generator 21 of the pretensioner mechanism 20A when receiving a detected collision signal more than a reference value from a collision sensor 9. A webbing 1 is of the type having the fuse characteristic as shown in FIG. 6B which is identical to that of the first embodiment.

Figure 7:
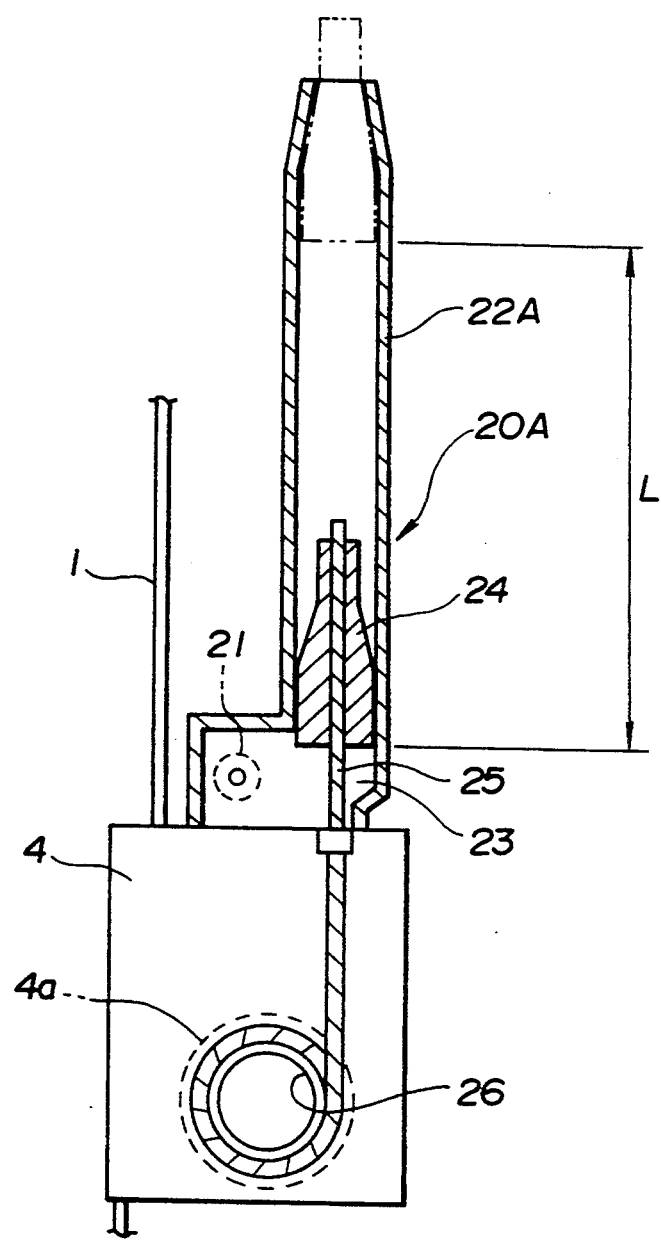
FIG. 7 is a view similar to FIG. 3, showing the pretensioner in the second embodiment.

Referring to FIG. 7, the pretensioner mechanism 20A includes a setting means for setting the retraction amount of the webbing 1 to the total of the slack amount of the webbing 1 upon setting to the passenger and the elongation amount thereof until a load arrives at the fuse load value No. That is, the retraction amount of the webbing 1 by the pretensioner mechanism 20A is determined by a movable range L of a piston 24, which is in turn determined by a length of a cylinder 22A. Referring also to FIG. 9B, the movable range L of the piston 24 has a value obtained by multiplying a diameter ratio of a shaft 26 to a reel 4a by a set retraction amount C which is the total of the slack amount A of the webbing 1 and the elongation amount B until a load arrives at the fuse load value No. That is, according to the pretensioner 20A in the second embodiment, a jet of gas into a lower chamber 23 from the gas generator 21 starts retraction of the webbing 1. And, when tension of the webbing 1 as retracted arrives at the fuse load value No, the piston 24 occupies the uppermost position as indicated by a two-dotted chain line in FIG. 7, having a restrained upward motion by the cylinder 22A, thus completing retraction of the webbing 1. It will be understood that in the second embodiment, the pretensioner mechanism 20A and the control part 10B constitute a pretensioner means. For the elongation amount B until tension of the webbing 1 arrives at the fuse load amount No, it is preferable to carry out previously a tension test for measuring a load-displacement characteristic of the webbing 1, and use an average of the results thereof.

Figure 8:
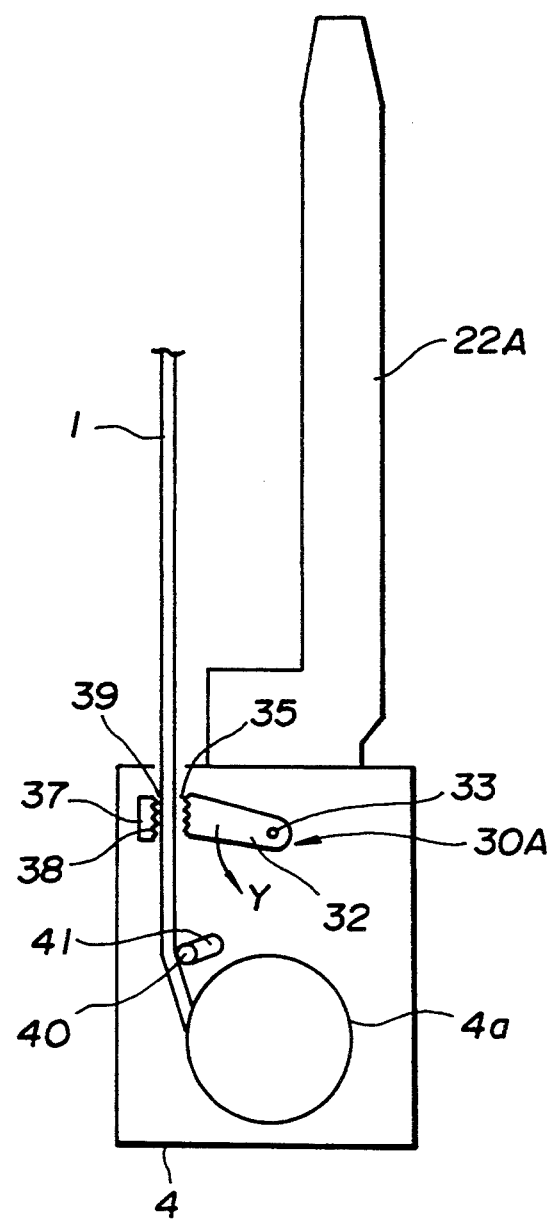
FIG. 8 is a view similar to FIG. 7, showing the clamp mechanism in the second embodiment.

Referring to FIG. 8, the clamp mechanism 30A is constructed to hold the webbing 1 by using tension produced in the webbing 1 due to retraction by the pretensioner mechanism 20A. Specifically, with the clamp mechanism 30A, retraction by the pretensioner mechanism 20A produces tension in the webbing 1. When this tension goes close to the fuse load value No, a guide pin 40 is urged to move through a long hole 41 of the retractor 4, and the webbing 1 contacts teeth 35 of a clamp arm 32 to rotate same about a shaft 33 downward or in the direction as indicated by an arrow Y in FIG. 8. And, when tension of the webbing arrives at the fuse load value No, the teeth 35 of the clamp arm 32 and teeth 37 of a receiver 38 cooperate each other to hold the webbing 1.

Therefore, according to the second embodiment, if, in the state that the webbing 1 is set as shown in FIG. 6A, vehicular collision occurs and the collision sensor 9 outputs a detected collision signal more than the reference value to the control part 10A, the control parts 10A ignites the gas generator 21 of the pretensioner mechanism 20A. Then, the pretensioner mechanism 20A starts retraction of the webbing 1 as shown in FIG. 9A, which is finished when the webbing 1 is retracted by the set retraction amount C. Upon completion of retraction of the webbing 1 by the pretensioner mechanism 20A, a load operating on the webbing 1 arrives at the fuse load value No as shown in FIG. 9B. Therefore, tension of the webbing 1 also arrives at the fuse load value No in a short period of time as shown in FIG. 9C. Thereafter, the passenger is restrained only based on the fuse characteristic of the webbing 1, so that tension of the webbing 1 is substantially constant, having reduced impact to the passenger.

In brief, according to the second embodiment, without controlling the retraction amount of the webbing 1 by a load operating on the webbing 1, upward motion of the piston 24 is regulated by the cylinder 22A when the webbing 1 is retracted by the set retraction amount C. When retraction of the webbing 1 by the pretensioner mechanism 20A is finished, and tension thereof coincides with the fuse load value No, the clamp mechanism 30A is driven by tension of the webbing 1. Therefore, the load cell can be eliminated, resulting in a simple control operation of the control part 10A, and also a simple structure of the entirety of the seat belt system.

Further, according to the second embodiment, since the pretensioner mechanism 20A is constructed to retract the webbing 1 by the set retraction amount C, the position of completion of retraction varies on the Fuse characteristic as shown in FIG. 9B due to a difference in the slack amount of the webbing 1. By way of example, in case that the webbing 1 has small slack amount and thus the pretensioner mechanism 20A retracts the webbing 1 somewhat too much up to a point "a" as shown in FIG. 9B, there arises no inconvenience if a part of the fuse characteristic of the webbing 1 is set to exceed the amount requisite to passenger restraint. On the other hand in case that the webbing 1 has great slack amount and thus the pretensioner mechanism 20A completes retraction of the webbing 1 before tension of the webbing 1 arrives at the fuse load value No as indicated by a point "b" in FIG. 9B, if starts from the point "b", tension of the webbing 1 arrives at the fuse load value No in an instant before the webbing 1 elongates substantially, causing no inconveniences such as lagged initial restraint and increased passenger's head forward displacement amount. Further, in case that the characteristic is very hard in the first half thereof until tension of the webbing 1 arrives at the fuse load value No, the retraction amount of the webbing 1 by the pretensioner mechanism 20A may be set to a value substantially immediately before rising of tension of the webbing 1 in view of the first half of the characteristic (see a point "d" as shown in FIG. 9B). With start of passenger restraint, tension of the webbing 1 arrives at the fuse load value No with substantially no elongation of the webbing 1 so as to carry out based on the fuse characteristic, causing no inconveniences on performance. Moreover, retraction of the webbing 1 fails to need until tension of the webbing 1 arrives at the fuse load value No, and thus energy necessary for retraction of the webbing 1 by the pretensioner mechanism 20A is decreased, resulting in minimized powder amount of the gas generator 21, and therefore, minimized strength of the pretensioner mechanism 20A.

Figure 10:
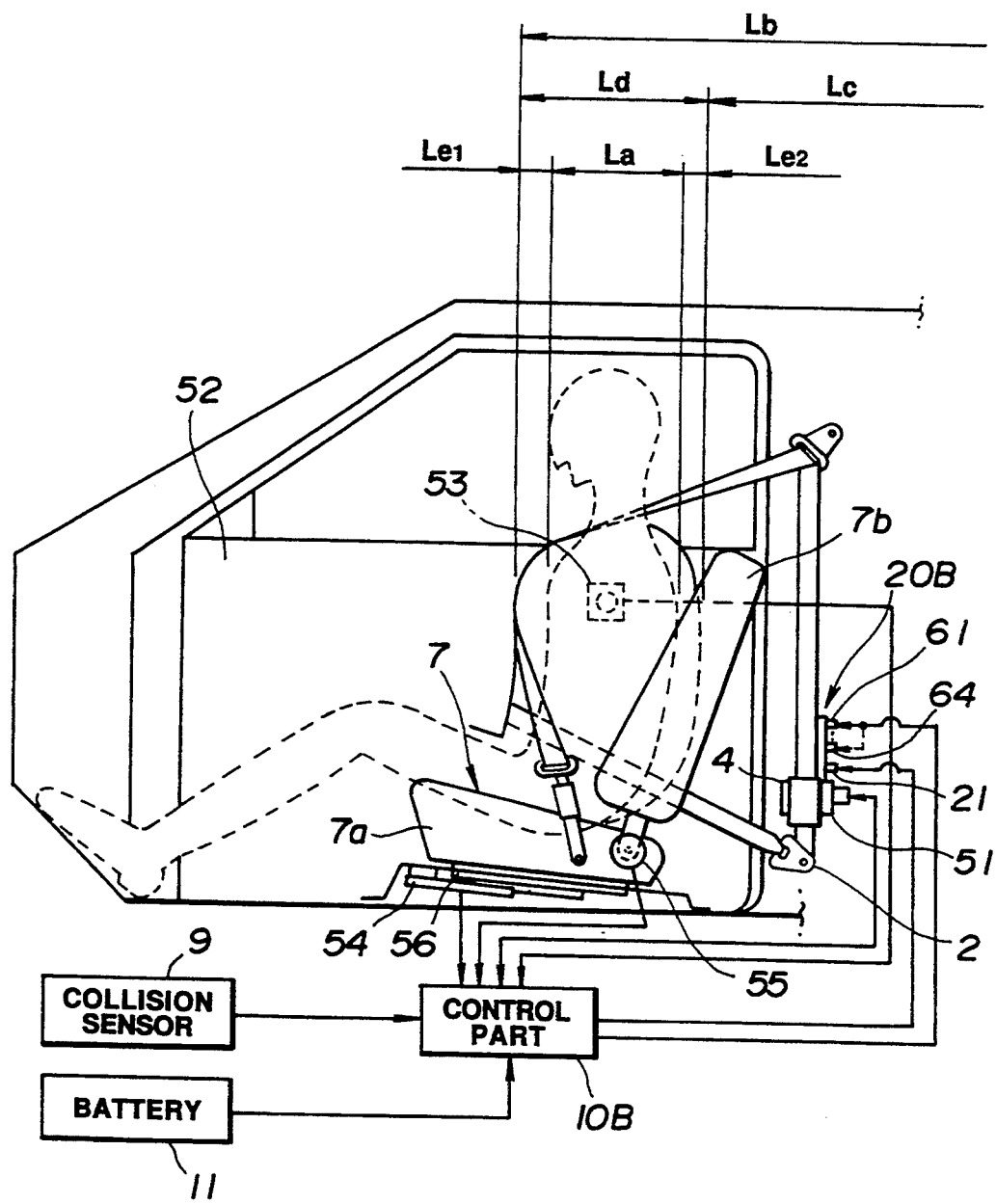
FIG. 10 is a view similar to FIG. 6A. showing a third embodiment of the present invention.
Figure 11:
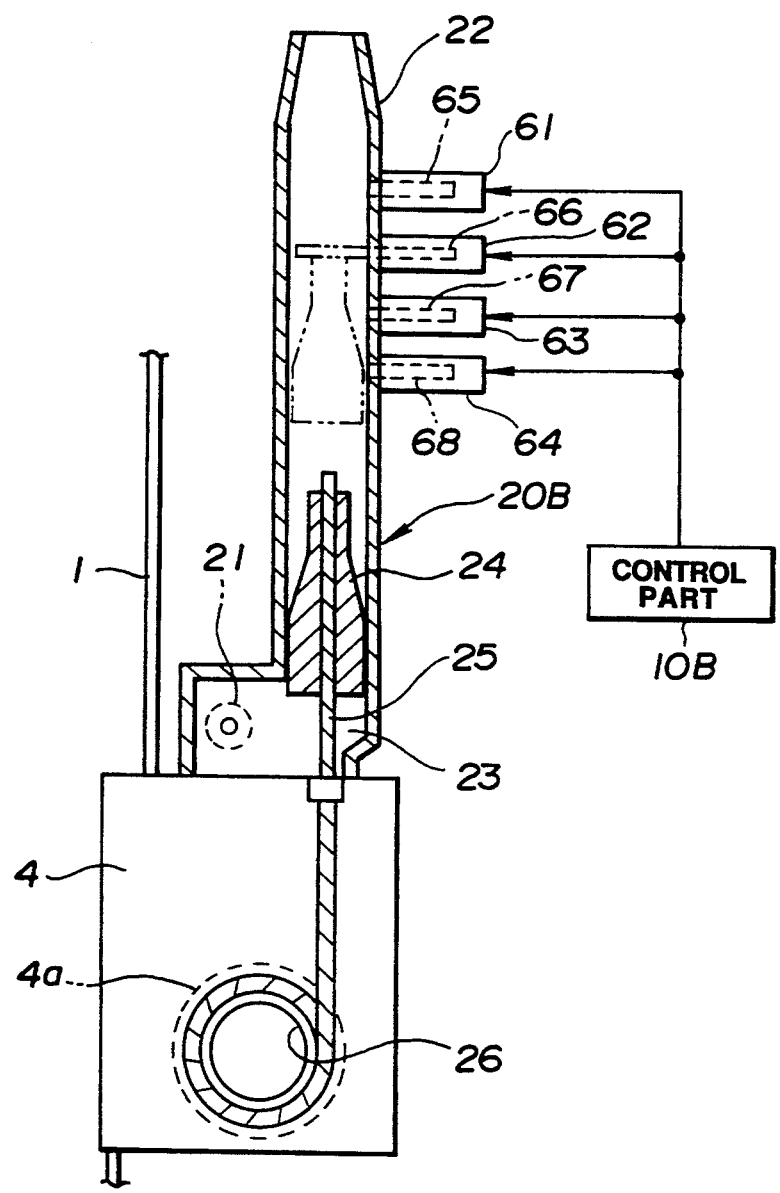
FIG. 11 is a view similar to FIG. 7, showing the pretensioner in the third embodiment.
Figure 12:
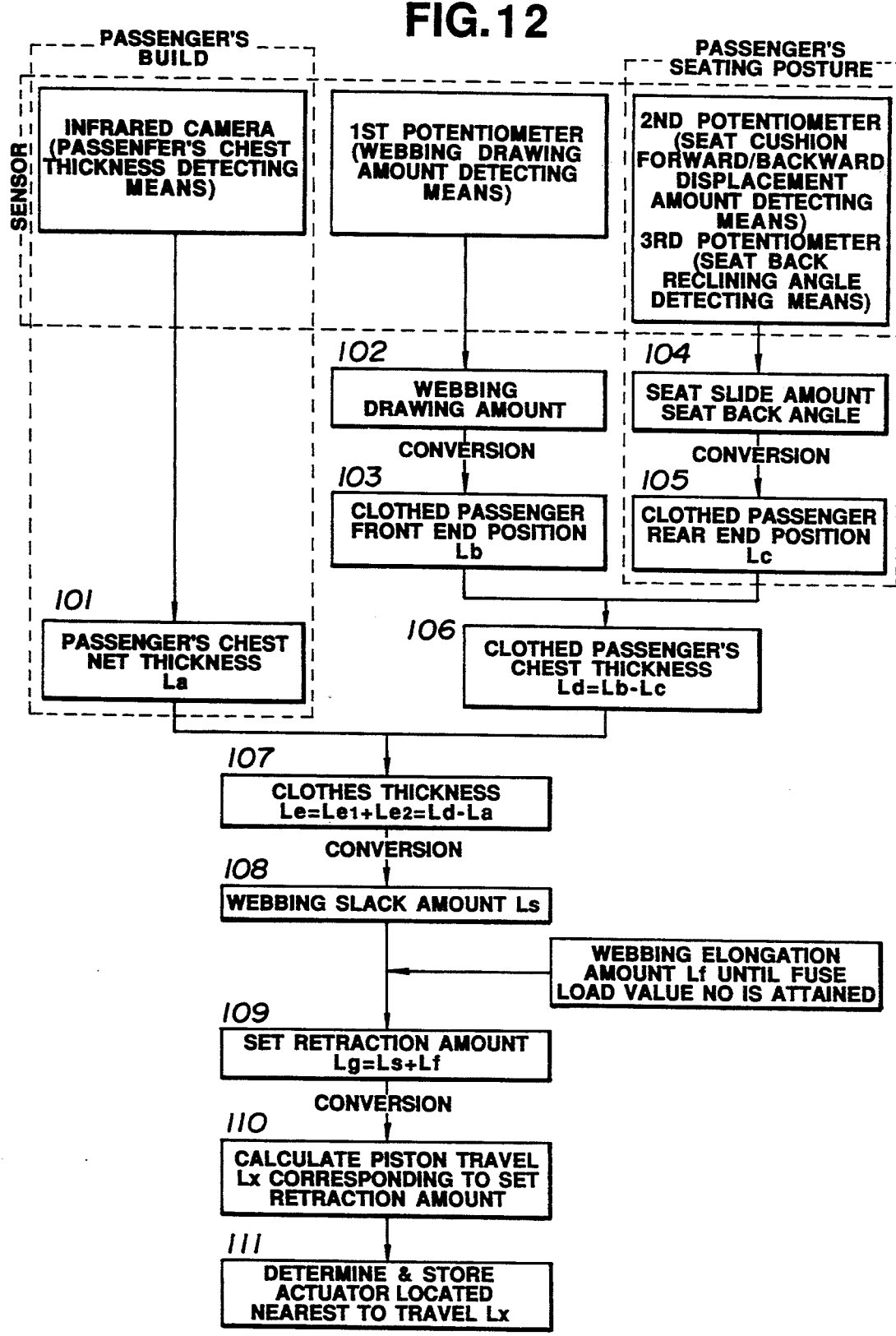
FIG. 12 is a flowchart showing the operation of the third embodiment.
Figure 13:
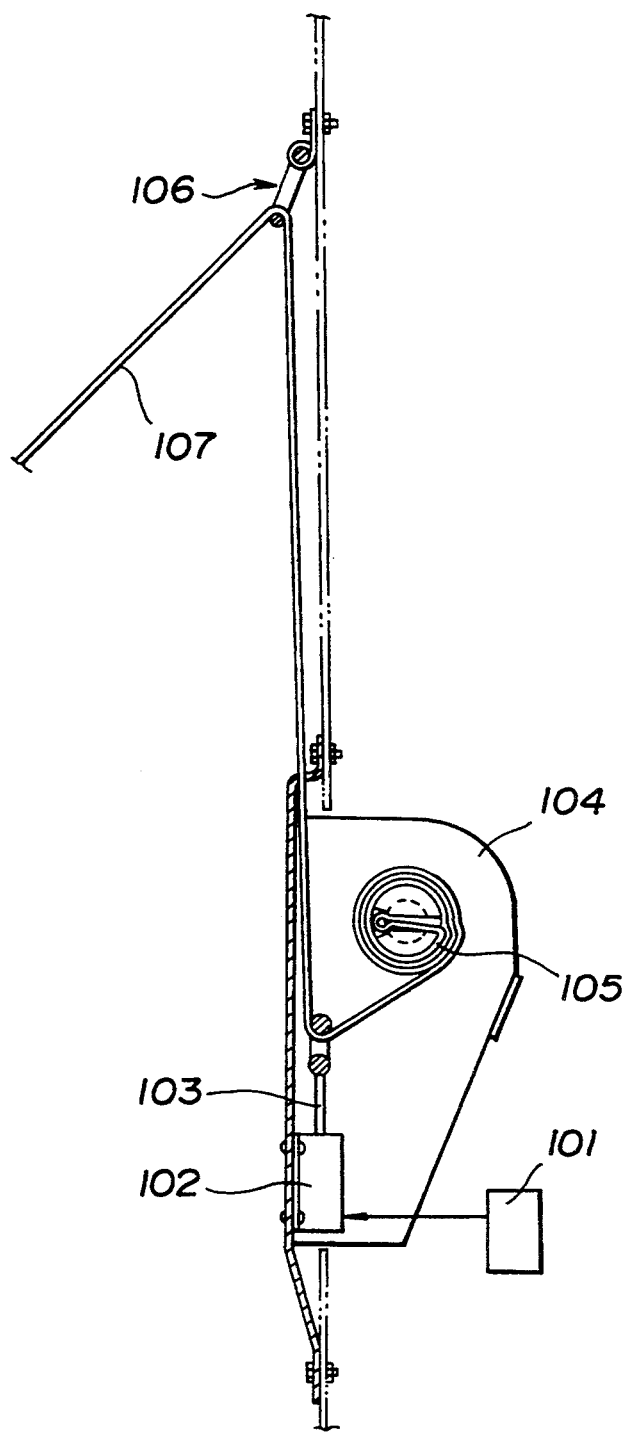
FIG. 13 is a view similar to FIG. 11, showing the prior art.

Referring to FIGS. 10-12, there is shown a third embodiment of a seat belt system of the three-point type. Referring to FIG. 10, this seat belt system has the following features. When the passenger sets a webbing 1, a control part 10B receives various informations such as a passenger's build, clothes, seating posture, etc. from an infrared camera 53 and first, second, and third potentiometers 51, 54, 55 as will be described later, and estimates the slack amount of the webbing 1 before collision. Then, the control part 10B estimates the retraction amount of the webbing 1 in accordance with the slack amount thereof as estimated, and stores the retraction amount as estimated as a set retraction amount. When receiving a detected collision signal more than the reference value from a collision sensor 9, the control part 10B regulates the retraction amount of the webbing 1 by a pretensioner mechanism 20B to the set retraction amount. Specifically, the retractor 4 is directly, or without a load cell 3 (see FIG. 1A), mounted to the vehicular body in the lower part thereof. Attached to the retractor 4 are a pretensioner mechanism 20B and a first potentiometer 51 as a webbing retraction amount detecting means 51. When the passenger draws out the webbing 1 from the retractor 4 upon setting thereof, the first potentiometer 51 detects a rotating speed of a reel 4a as shown in FIG. 11 as the retraction amount of the webbing 1, and outputs it to the control part 10B. The infrared camera 53 as a passenger's chest thickness detecting means is mounted to a vehicular door 52 located at the side of the passenger seated on a seat 7. The infrared camera 53 picks up infrared rays radiating from the passenger's chest seated on the seat 7 and in accordance with a body temperature so as to detect a net thickness La of the passenger's chest which affects the slack amount of the webbing 1, and outputs it to the control part 10B. Mounted to the seat 7 are the second potentiometer 54 as a seat cushion forward/backward displacement amount detecting means, and the third potentiometer 55 as a seat back reclining angle detecting means. The second potentiometer 54 detects a forward/backward displacement amount of a seat cushion 7a by a seat slide mechanism 56, and outputs it to the control part 10B. The third potentiometer 5S detects a reclining angle of the seat back 7b by a reclining mechanism (not shown), and outputs it to the control part 10B.

Referring to FIG. 11, the pretensioner mechanism 20B includes a cylinder 22 to which a plurality of electromagnetic drive self-reset type actuators 61, 62, 63, 64 are mounted axially parallel with each other. The plurality of actuators 61, 62, 63, 64 house pins 6S, 66, 67, 68, respectively. When the pins 65, 66, 66, 68 are housed within the actuators 61, 62, 63, 64 by tile self-reset function thereof, the pins 65, 66, 67, 68 have respective pointed ends intruded into a peripheral wall of the cylinder 22 on one side thereof in the degassing preventing state. The pins 65, 66, 67, 68 protrude into the cylinder 22 by the electromagnetic drive function of the actuators 61, 62, 63, 64 based on output of the control part 10B, regulating movement of the piston 24. That is, the control part 10B electromagnetically drives the actuator located nearest to a required travel Lx of the piston 24 which is obtained in accordance with the set retraction amount Lg as will be describe later, so that the pin of that actuator protrudes into the cylinder 22. By way of example, referring to FIG. 11, suppose that the second actuator 62 occupies the position nearest to the required travel Lx of the piston 24. The control part 10B electromagnetically drives the actuator 62, so that the pin 66 protrudes into the cylinder 22 perpendicularly as indicated by a two-dotted line in FIG. 11, regulating the travel of the piston 24 from the range as indicated by a fully drawn line to that one as indicated by the two-dotted chain line. Referring also to FIG. 11, in the process of moving from the position as indicated by the fully drawn line to that one as indicated by the two-dotted chain line, the piston 24 passes, for example, the third and fourth pins 67, 68, which has no harmful influence on movement of the piston 24, i.e., retraction of the webbing 1 by the pretensioner mechanism 20B since the pointed ends of the pins 67, 68 are intruded into the peripheral wall of the cylinder 22 on one side thereof in the degassing preventing state.

Referring to FIG. 12, tilere is shown an operation of the control part 10B as an estimating means which estimates the retraction amount of the webbing 1 to be produced until tension of the webbing 1 coincides with the fuse load value No based on informations such as a passenger's build, clothes, and seating posture, etc., and finishes retraction of the webbing 1 at the retraction amount of the webbing 1 as estimated. Referring also to FIG. 12, when the passenger engages the tongue 8 with the buckle 8 for setting the webbing 1, and the control operation of the control part 10B is started, the control part 10B receives an output signal of the infrared camera 53 indicative of the net thickness La of the passenger's chest (step 101). In parallel with this, a front end position Lb of the passenger having clothes is estimated based on an output signal of the first potentiometer 51, and also a rear end position Lc of the passenger having clothes is estimated based on output signals of the second and third potentiometers 54, 55 is estimated (steps 102, 103, 104, 105). A difference Lb−Lc between the front end position Lb and the rear end position Lc is obtained to get a thickness Ld=Lb−Lc of the passenger's chest having clothes, then a difference Ld−La between the thickness Ld of the passenger's chest having clothes and the net thickness La of the passenger's chest is obtained to get a thickness Le=Le$_1$+Le$_2$ of the clothes (steps 106, 107). This thickness Le of the clothes is an amount of denting when the pretensioner mechanism 20B retracts the webbing 1. Thus, the control part 10B carries out conversion of the thickness Ld of the clothes as a slack amount to obtain a slack amount Ls of the webbing 1 (step 108). A length obtained by adding the slack amount Ls to an elongation amount Lf (which is a little) of the webbing 1 until tension of the webbing 1 arrives at the fuse load value No becomes a set retraction amount or required retraction amount Lg of the pretensioner mechanism 20B (step 109). Based on a geometrical structure of the pretensioner mechanism 20B, the required travel Lx of the piston 24 when producing the set retraction amount Lg is calculated (step 110). The actuator located nearest to the required travel Lx of the piston 24 as calculated is determined, which is stored in a memory of the control part 10B (step 111). It is to be noted that processing from the step 101 to the step 111 is repeatedly carried out upon setting of the webbing 1, after setting thereof, and also in case of changing the longitudinal position of the seat cushion 7a and the reclining angle of the seat back 7b, and that actuator determining data at the step 111 is updated each time to be always the latest data before collision. When receiving a detected collision signal more than the reference value from the collision sensor 9, the control part 10B outputs igniting power to the gas generator 21 of the pretensioner mechanism 20B, and also a drive power to the actuator corresponding to actuator determining data as stored.

Therefore, according to the third embodiment, based on a difference of a passenger's build, clothes, or seating posture, the retraction amount of the webbing 1 by the pretensioner mechanism 20B upon collision is automatically set so that tension of the webbing 1 is equal to the fuse load value No. Thus. although the entirety of the seat belt system becomes slightly expensive, the passenger can be restrained based on the fuse characteristic of tile webbing 1 in consideration of a difference of a passenger's build, clothes, seating posture. etc., resulting in minimum impact degree to the passenger and optimum n performance.

It is to be noted that in the present invention, the impact detecting means may be an impact sensor, and that when an impact degree detected by the impact sensor is more than the reference impact value previously set in the control part, retraction of the webbing by the pretensioner mechanism may be started.

What is claimed is:

1. A seat belt system for a vehicle having a vehicular body, comprising:
   a webbing comprising a base material having high extensibility and an additional material having high extensibility and an additional material having low extensibility, said webbing elongating a predetermined amount to restrain a load increase of said webbing when a tension of said webbing coincides with a fuse load as previously set;
   an anchorage mounted to the vehicular body, said anchorage being connected to said webbing at one end thereof;
   a retractor mounted to the vehicular body, said retractor being connected to bias webbing at another end thereof for winding said webbing;
   an impact detecting means for detecting an impact which the vehicular body undergoes; and
   a pretensioner means for starting a retraction of said webbing responsive to dais impact detected by said impact detecting means, and competing said retraction of said webbing when said tension of said webbing coincides with said fuse load.

2. A seat belt system as claimed in claim 1, further comprising:
   a tension detecting means for detecting said tension of said webbing,
   said pretensioner means completing said retraction of the webbing in response to said tension detecting a tension which coincides with said fuse load.

3. A seat belt system as claimed in claim 2, wherein said tension detecting means includes a load cell.

4. A seat belt system as claimed in claim 1, further comprising:
   a holding means for holding said webbing when said tension of said webbing coincides with said fuse load,
   said holding means being part of said pretensioner means and completing said retraction of said webbing.

5. A seat belt system as claimed in claim 4, wherein said holding means includes a clamp mechanism.

6. A seat belt system as claimed in claim 1, wherein said pretensioner means includes a setting means for setting a retraction amount of said webbing until said tension of said webbing coincides with said fuse load to a total value of a slack amount of said webbing upon setting of said webbing and an elongation amount of said webbing until said tension of said webbing coincides with said fuse load.

7. A seat belt system as claimed in claim 6, wherein said pretensioner means includes an estimating means for estimating said retraction amount until said tension of said webbing coincides with said fuse load from passenger informations, and completing said retraction of said webbing at said retraction amount as estimated.

8. A seat belt system as claimed in claim 7, wherein said estimating means includes a control part.

9. A seat belt system as claimed in claim 7, wherein said passenger informations include a passenger's build, clothes, and seating posture.

10. A seat belt system as claimed in claim 7, wherein said setting means includes a cylinder.

11. A seat belt system as claimed in claim 1, wherein said impact detecting means includes a collision sensor.

* * * * *